United States Patent
Fich et al.

(10) Patent No.: US 8,022,652 B2
(45) Date of Patent: Sep. 20, 2011

(54) METHOD FOR CONTROLLING A MECHANICALLY COMMUNICATED ELECTRIC MOTOR

(75) Inventors: Preben Bo Fich, Kent (GB); Curt Michael Peterson Willadsen, Hornbaek (DK)

(73) Assignee: IDEAssociates (IOM) Ltd., Douglas (IM)

( * ) Notice: Subject to any disclaimer, the term of this patent is extended or adjusted under 35 U.S.C. 154(b) by 366 days.

(21) Appl. No.: 12/065,570

(22) PCT Filed: Sep. 1, 2006

(86) PCT No.: PCT/DK2006/000475
§ 371 (c)(1),
(2), (4) Date: Mar. 3, 2008

(87) PCT Pub. No.: WO2007/028384
PCT Pub. Date: Mar. 15, 2007

(65) Prior Publication Data
US 2008/0246422 A1    Oct. 9, 2008

(30) Foreign Application Priority Data

Sep. 5, 2005  (EP) .................................... 05388071
Sep. 5, 2005  (EP) .................................... 05388074

(51) Int. Cl.
*H02P 8/00* (2006.01)
(52) U.S. Cl. ........................... 318/443; 318/85; 318/685
(58) Field of Classification Search .......... 318/244–246,
318/66, 68, 85, 62, 264–266, 272, 275, 277,
318/282, 286, 466–468, 685, 696, 443, 444;
388/800, 809, 811, 816, 819
See application file for complete search history.

(56) References Cited

U.S. PATENT DOCUMENTS

| | | | | |
|---|---|---|---|---|
| 3,624,474 A * | 11/1971 | Nole | ............... | 318/261 |
| 4,024,864 A * | 5/1977 | Davies et al. | ............... | 604/67 |
| 4,481,448 A * | 11/1984 | Bishop | ............... | 318/248 |
| 4,514,670 A | 4/1985 | Fassel et al. | | |
| 4,527,101 A * | 7/1985 | Zavis et al. | ............... | 318/245 |
| 4,866,554 A | 9/1989 | Stupeck | | |
| 5,216,340 A * | 6/1993 | Welch | ............... | 318/443 |
| 5,675,464 A * | 10/1997 | Makaran et al. | ............... | 361/23 |
| 5,811,946 A * | 9/1998 | Mullin et al. | ............... | 388/811 |
| 6,150,782 A * | 11/2000 | Breitling et al. | ............... | 318/434 |
| 6,750,622 B2 * | 6/2004 | Simizu et al. | ............... | 318/139 |
| 6,944,906 B2 * | 9/2005 | Moein et al. | ............... | 15/250.3 |
| 6,954,044 B2 * | 10/2005 | McMillan et al. | ............... | 318/400.34 |
| 7,294,981 B2 * | 11/2007 | Marty | ............... | 318/139 |

(Continued)

FOREIGN PATENT DOCUMENTS

DE    3744188 A1    7/1989

(Continued)

OTHER PUBLICATIONS

Search Report issued in WO 2007/028384 (PCT/DK2006/000475) (Nov. 2006).

(Continued)

*Primary Examiner* — Bentsu Ro
(74) *Attorney, Agent, or Firm* — Browdy and Neimark, PLLC

(57) ABSTRACT

A method for controlling a mechanically commutated electric motor, wherein the rotational angle of the output of said motor is determined by means of detection of the change in back electromotive force, when the electric motor commutates, and wherein the power supply to the electric motor is halted after a predetermined number of detected commutations.

11 Claims, 2 Drawing Sheets

U.S. PATENT DOCUMENTS

Figure 1:
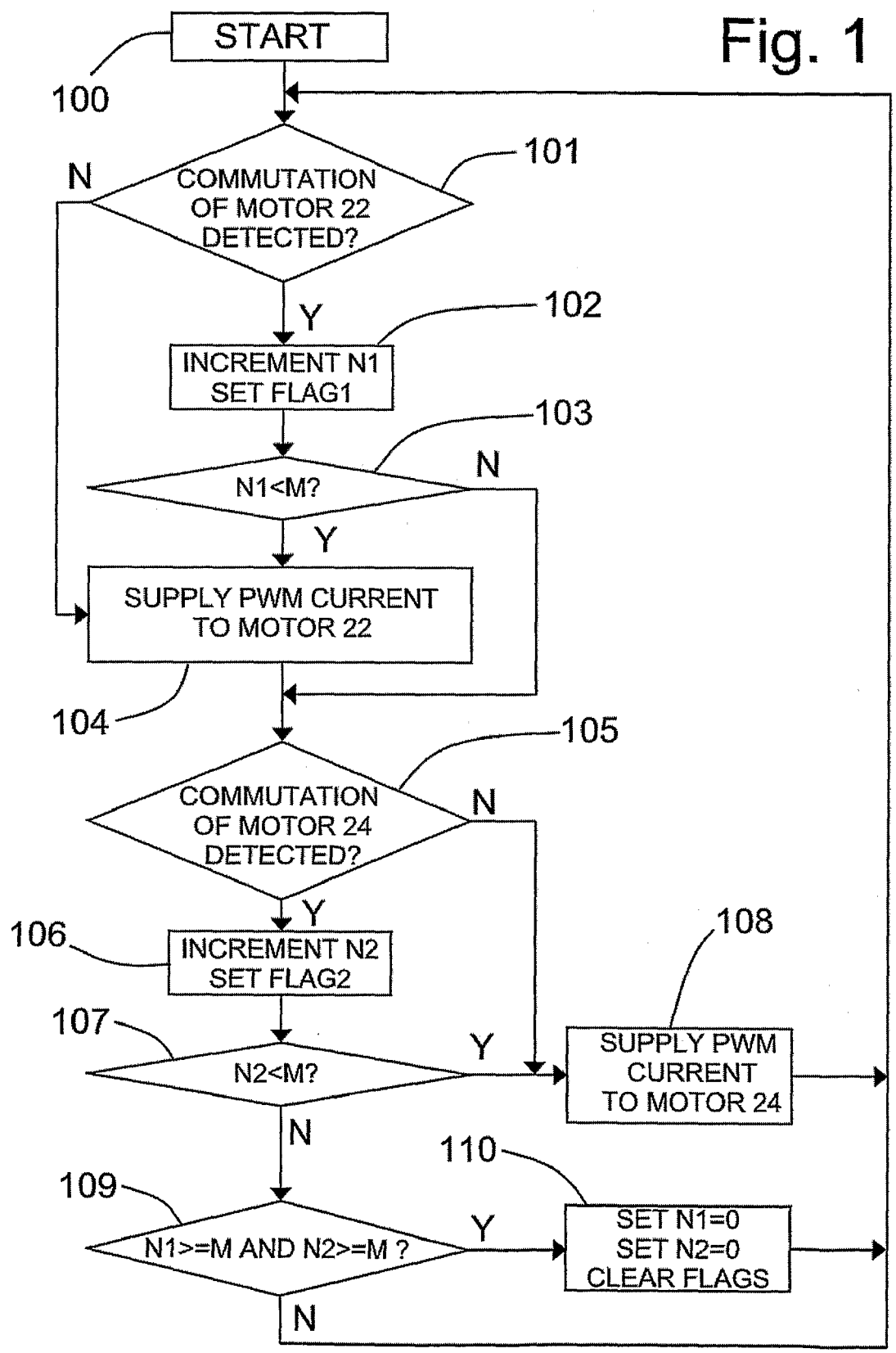

| | | |
|---|---|---|
| 7,520,498 B2 * | 4/2009 | Hattori et al. .............. 270/58.07 |
| 2002/0185926 A1 | 12/2002 | King et al. |
| 2003/0174522 A1 | 9/2003 | Xu et al. |
| 2006/0138982 A1 | 6/2006 | Marty |

FOREIGN PATENT DOCUMENTS

| | | |
|---|---|---|
| EP | 1674655 A1 | 6/2006 |
| FR | 2790885 A1 | 9/2000 |
| JP | 10-084691 | 7/1980 |
| JP | 58-033992 | 2/1983 |
| JP | 2-060446 | 2/1990 |
| JP | 11-041939 | 2/1999 |
| SU | 725723 | 12/2004 |
| WO | 99/65135 | 12/1999 |
| WO | 2004/104667 | 12/2004 |
| WO | 2006/111144 | 10/2006 |
| WO | 2007/028384 A1 | 3/2007 |

OTHER PUBLICATIONS

Written Opinion of the International Search Authority issued in WO 2007/028384 (PCT/DK2006/000475) (Dec. 2007).

International Preliminary Report on Patentability issued in WO 2007/028384 (PCT/DK2006/000475) (Dec. 2007).

* cited by examiner

METHOD FOR CONTROLLING A MECHANICALLY COMMUNICATED ELECTRIC MOTOR

The present invention relates to a method for controlling an electric motor by means of a microprocessor controlling the power supply to said motor. More specifically the present invention relates to a method for controlling a mechanically commutated electric motor such as a DC motor or a universal motor, as well as to a microprocessor controlled DC power supply.

Mechanically commutated electric motors, i.e. motors where a brush and commutator arrangement changes the polarity of the current in the armature windings, as the armature rotates, within magnetic fields produced by the stator, are well known in the art. The magnetic fields in such motors may be produced by means of permanent magnets or electromagnets. If the magnetic field is provided by electromagnets, the current in the windings, which produce the magnetic field of the stator, may be provided by a separate magnetizing current, or it may be provided by the same current as the one passing through the armature windings. The latter is commonly referred to as a universal motor, as it is also quite suitable for AC, as long as the AC frequency it not too high. Such a universal motor works very well at the most commonly used AC frequencies such as 16⅔ Hz, 50 Hz or 60 Hz.

The mechanically commutated permanent magnet DC motor is the most commonly used motor for small and medium electric and electronic devices. Consequently such motors are produced in very large numbers, hence making them very cheap.

PWM or switch-mode controlled electric motors are well-known in the art and employed in a variety of electric drive applications including one or more mechanically commutated electric DC motors. Typical applications, to which the present invention pertains, include drive arrangements for lifting and lowering of height adjustable furniture components like tabletops, chairs and other resting furniture for domestic, office and medical use, motion control of robot devices etc.

In such applications it is desirable to use several motors, e.g. two, one at each end of the tabletop. If two motors are used, they will often be subjected to different loads, and they must then be synchronized in their operation in order to keep the tabletop level. On this background it is the object of the invention to provide a method for controlling a mechanically commutated electric motor, in particular so as to allow a first and a second electric motor to operate in synchronicity.

According to a first aspect of the invention this is achieved by a method for controlling a mechanically commutated electric motor, wherein the rotational angle of the output of said motor is determined by means of detection of the change in back electromotive force, when the electric motor commutates, and wherein the power supply to the electric motor is halted after a predetermined number of detected commutations.

The inventors have realize that by performing this detection and halting whenever necessary the overall current supply to the motor, it is possible to operate an ordinary mechanically commutated electric motor as a stepper motor. This is a major advantage, as the such ordinary mechanically commutated electric motors cost far less than a steppermotor.

According to a preferred embodiment of the invention, wherein said number of detected commutations is one. This allows the electric motor to operate in discrete steps a stepper motor with a number of steps corresponding to the number of commutations per revolution.

According to a further preferred embodiment said change in back electromotive force is detected by measurement of the voltage over an inductor and/or a resistor connected in series with said motor in a supply line thereto. This allows the detection to take place directly in one of the supply lines thereto, which again allows the rotational angle to be detected by measurements made directly in the power supply for the motors. Any necessity for additional tachos or encoders, as well as separate lines thereto is thus obviated.

According to yet another embodiment of the invention the mechanically commutated electric motor is a universal or series motor comprising at least one field coil, and wherein said at least one field coil comprises the inductor over which said voltage is measured. Utilizing the field coil avoids the use of additional inductors in the supply circuit, thus reducing the necessary circuitry.

According to specifically preferred embodiment the mechanically commutated electric motor is controlled by means of pulse width modulation by a microprocessor. This allows for good control of the supply current to the electric motor allowing the motor to be halted, whenever a desired number of commutations have been detected.

According to yet a further preferred embodiment, if a commutation is detected, but said predetermined number of commutations has not been reached, the supply current is reduced during the commutation. This reduces the arcing, which occurs during commutation, thus leading to less wear and tear on the electric motor, and to reduced production of corrosive gasses.

According to a further specifically preferred embodiment the method is adapted for controlling at least one further mechanically commutated electric motor by means of a microprocessor controlling the power supply to said first motor and said further motor, said method comprising the steps of determining the rotational angles of the outputs of said first motor and said further motor by means of detection of the changes in back electromotive forces, when said first and further mechanically commutated electric motor commutates, when one of said first motor or said further motor reaches said predetermined angle disabling the current supply to that motor, enabling the current supply to said one of said first motor and said further motor again when the other of said first motor and further motor reaches said predetermined angle.

With this method it is possible to operate the ordinary mechanically commutated electric motors in discrete steps of operation, where the first motor to reach a given angle of rotation stops and waits for the other. Thus, with appropriately chosen steps the overall operation of the motors is synchronous.

According to a second aspect of the invention, the method is used for the control of motors in furniture.

Figure 2:
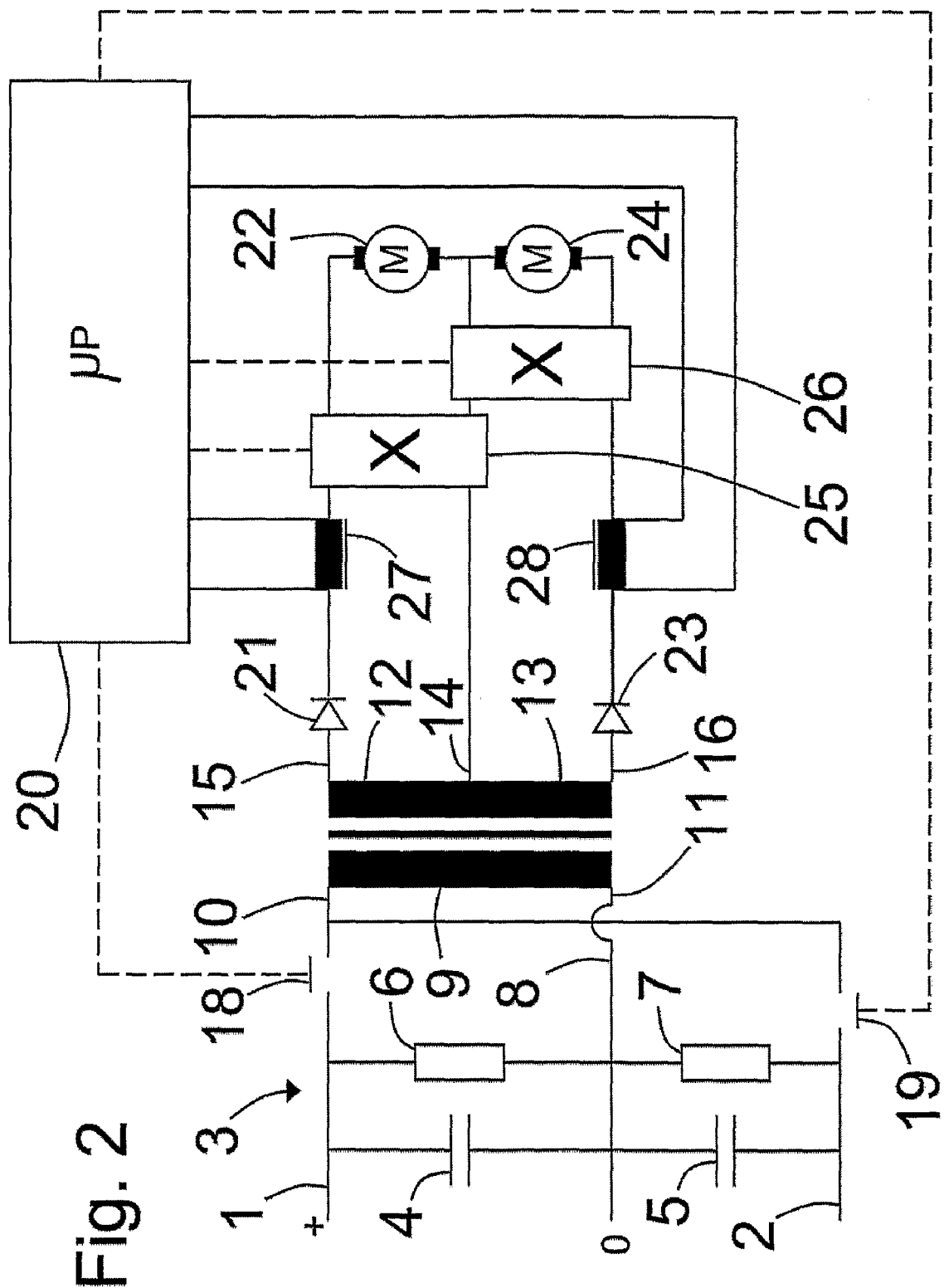

The invention will now be described in greater detail based on non-limiting exemplary embodiments and with reference to the drawings, on which FIG. 1 shows a flowchart of a preferred embodiment of the method according to the invention, and FIG. 2 shows a diagram of a power supply adapted for executing the method according to the invention.

The basic idea behind the present invention resides in the fact that the inventors have realized that the commutations of an ordinary mechanically commutated electric motor are readily detectable by means of measurement of the change in back electromagnetic force. This is specifically the case when a pulse width modulated current supply to the mechanically commutated electric motor is used, where the inventors have realized that the voltage generated by the back electromotive force is readily detectable between the pulse width modulated pulses.

The detection of the commutations by means of the back electromotive force in combination with a microprocessor controlled pulse width modulation of the supply current, allows the supply current to a motor be halted, the motor thus effectively operating as a stepper motor with a resolution, corresponding the maximum number of commutations per revolution of the mechanically commutated electric motor.

Though this number is normally smaller than the resolution of a stepper motor, the fact that the mechanically commutated electric motor is far cheaper, makes the invention attractive any application where an operation in steps is desired or needed, but the higher resolution is not necessary.

One such application is synchronisation of motors, e.g. for lifting tabletops or the like.

The flow chart of FIG. 1 illustrates a preferred embodiment of the method according to the invention in an implementation for controlling two mechanically commutated electric DC motors 22, 24 by means of a microprocessor 20, cf. FIG. 2. The skilled person will realize that other types of mechanically commutated electric motors, such as universal or series motors could be used in stead.

The method starts in step 100 and proceeds to the decision in step 101. If in step 101 a commutation of the motor 22 is not detected, the microprocessor 20 proceeds to step 104 and provides at least one pulse width modulated current pulse to the motor 22. If on the other hand a commutation is detected in step 101 the microprocessor increments a counter N1 in step 102 and sets a detection flag FLAG1. Then, in step 103 the microprocessor 20 checks whether the counter N1 has reached a predetermined value M. If N1 has not yet reached the predetermined value M, the microprocessor 20 proceeds to step 104 and provides at least one pulse width modulated current pulse to the motor 22. If N1 has reached or exceeded the predetermined value M, the microprocessor proceeds to step 105 to check whether a commutation has been detected for the second motor 24.

Essentially, the steps 105 to 108 correspond to the steps 101 to 104. Thus, if in step 105 a commutation of the motor 24 is not detected, the microprocessor 20 proceeds to step 108 and provides at least one pulse width modulated current pulse to the motor 24. If on the other hand a commutation is detected in step 105, the microprocessor increments a counter N2 in step 106 and sets a detection flag FLAG2. Then, in step 107 the microprocessor 20 checks whether the counter N2 has reached a predetermined value M. If N2 has not yet reached the predetermined value M, the microprocessor 20 proceeds to step 108 and provides at least one pulse width modulated current pulse to the motor 24, upon which the microprocessor returns to step 101 and repeats the process. If N2 has reached or exceeded the predetermined value M, the microprocessor 20 proceeds to step 109 to check whether both of N1 and N2 have reached or exceed the predetermined value M. If this is the case, N1 and N2 are both set to zero, and the detection flags FLAG1 and FLAG2 are cleared in step 110, and the microprocessor returns to step 101 to repeat the process.

The reason for the use of the flags FLAG1 and FLAG2 is that after detection of the predetermined number of commutations, the current supply to the motor will be stopped by the microprocessor, thus not allowing a direct detection in steps 101 or 105.

Here it should be mentioned that even though the above description relates to a method for controlling two motors, the skilled person will realize that it will possible to control further motors using the same principle, i.e. by adding appropriate variables N3 to Nn and flags FLAG3 to FLAGn, and duplicating the steps 101 to 104 for each of the further motors.

The predetermined value M may depend on the actual application, in which synchronized operation of two or more motors is desired. In particular, M may have the value 1, thus effectively turning each of the DC motors 22, 24 into a stepper motor. This would also be the case for a single motor, which then would not need any synchronization.

As will be understood, the method according to the invention operates each of the motors 22, 24 in steps in such a way that the faster of them stops after a predetermined angle and then wait for the remainder of the motors to reach this predetermined angle. This angle could correspond to one commutation as indicated above, but in principle any multiple of commutations could be used, e.g. corresponding to one or more full revolutions or the motor.

In respect of synchronization it should be noted that the microprocessor 20 may furthermore adjust the pulse width modulation to increase the current supplied to a motor if that specific motor consistently runs slower that the first to reach the predetermined angle. Evidently, as an alternative, the current to the faster motor could be reduced.

Evidently each of the motors 22, 24 could be controlled by its own individual microprocessor 20. It is however preferred to use one single microprocessor 20 for the control of several motors 22, 24, as the processing speed of the microprocessor 20 will be fully sufficient to do so.

FIG. 2 illustrates a microprocessor controlled DC power supply suitable for executing the method according to the invention.

The power supply is preferably a DC/DC power supply. The power supply is provided with DC, such as rectified mains, at the positive terminal 1 and the negative terminal 2. Between the positive terminal 1 and the negative terminal 2 there is provided a voltage divider 3. In the preferred embodiment, the voltage divider 3 comprises two capacitors 4, 5 and two resistors 6, 7. Preferably the two capacitors 4, 5 have the same capacitance and the two resistors 6, 7 the same resistance. Thus, at the centre tab 8 of the voltage divider 3, there will be an intermediate potential. For illustration purposes, the intermediate potential is marked 0, but evidently the intermediate potential floats and is subject to variations depending on the current drawn from the voltage divider 3, unless it is stabilized by an external connection to a fixed reference potential.

The current is intermittently drawn from the voltage divider 3 by a transformer having a primary winding 9 with a first end 10 and a second end 11. The transformer has two secondary windings 12, 13 with a common terminal 14, and a first end terminal 15 and a second end terminal 16. The two secondary windings 12, 13 are preferably identical in number of turns and direction. The primary-to-secondary ratio is preferably 20:4/4 for the applications described, but may evidently differ from that ratio, depending on the actual application. For the sake of clarity it should be noted that even though reference is made to a transformer, it is not operated as a traditional AC transformer, but merely as an inductive energy storage means.

In order to allow the transformer to intermittently draw current from the voltage divider 3, the DC/DC power supply comprises two controlled switches 18, 19. The first controlled switch 18 is connected between the first end 10 of the primary winding 9 of the transformer and the positive terminal 1. The second controlled switch 19 is connected between the first end 10 of the primary winding 9 of the transformer and the negative terminal 2. Preferably the controlled switches 18, 19 are semiconductor switches controlled by means of a microprocessor 20. If galvanic separation between the primary winding 9 and secondary winding 12 of the transformer is desired, the control lines to the controlled switches 18, 19 may include optocouplers (not shown).

Both the controlled switches 18, 19 are operated intermittently by the microprocessor 20, e.g. according to a pulse width modulation scheme, as mentioned above.

The microprocessor 20 ensures that the controlled switches 18, 19 are not active at the same time, but otherwise the microprocessor operates the controlled switches 18, 19 independently of each other.

When said first controlled switch is active, current flows from the positive terminal 1 through the primary winding 9 to the centre tab 8 of the voltage divider 3, giving rise to a flux with a first direction in the transformer, which in turn gives rise to a current in the secondary winding. The current flows in the first secondary winding 12, through a first diode 21 connected to the first end terminal 15 to a first motor 22 and back to the common terminal 14. A second diode 23 prevents any current from running in the second secondary winding 13.

When said second controlled switch is active, current flows from the negative terminal 2 through the primary winding 9 to the centre tab 8 of the voltage divider 3, giving rise to a flux with a second direction in the transformer, which in turn gives rise to a current in the secondary winding. In this case the current flows in the second secondary winding 13, through the second diode 23 connected to the second end terminal 16 to a second motor 24 and back to the common terminal 14. Here, the first diode 21 prevents any current from running in the first secondary winding 12.

Since the controlled switches 18, 19 may be controlled independently of each other, it is possible to control the supply to two motors 22, 24 independently of each other using only one single transformer. In particular, with appropriate choice of modulation and duty cycle, the two controlled switches 18, 19 may be controlled in an alternating manner, the first controlled switch 18 being in the active part of its duty cycle, while the second controlled switch 19 is in its inactive part of the duty cycle, and vice versa. However, it is just as well possible to have the first controlled switch 18 performing a number of duty cycles without the second controlled switch 19 being active at all, and vice versa.

According to the invention, the power supply is especially adapted for the control of mechanically commutated electric DC motors 22 and 24, respectively.

Since in many applications, such as the tabletops mentioned above, it is necessary to reverse the direction of rotation of the motor, change-over switches 25, 26 for reversing the polarity in the supply lines to the motors 22, 24 have been introduced in the supply lines to the motors 22, 24. The change-over switches are preferably solid state switches controlled by the microprocessor 20. The microprocessor 20 is preferably adapted to operate the change-over switches 25, 26 in no-current conditions only in order to avoid unnecessary stress. The change-over switches 25, 26 do thus not have to have any load-breaking capacity. Moreover, the microprocessor prevents the two change-over switches 25, 26 from assuming conditions where the secondary windings 12, 13 are short circuited.

Bearing in mind the background of the invention, viz. height adjustable tabletops where two motors are used and must be synchronized in their operation order to keep the tabletop level, even when subjected to different loads, the power supply further comprises two inductors and/or resistors 27, 28 placed in series with a respective one of said first motor 22 and second motor 24. These inductors and/or resistors 27, 28 serve as means for measuring the back electromotive force from the respective mechanically commutated electric DC motors 22, 24. The inventors of the present invention have realized that the back electromotive force from the motors is readily detectable and may thus be used as a means for determining the angular position of the armature of the DC motor, provided of course that the number of commutations per revolution of the motor 22, 24 is known. The commutations are detected by the microprocessor 20 by means of a voltage measured over the inductors and/or resistors 27, 28, possibly using appropriate additional circuitry, not shown. In this respect it should be noted that it is currently preferred to use an inductor over a resistor. However, since ideal inductors without a resistive component, e.g. from the wire, are more or less theoretical, even using an inductor will normally involve a combination with some kind of resistor.

If one motor is subjected to a smaller load than the other, and consequently runs faster, the microprocessor 20 will stop the power supply to that motor at each and every commutation, or after a predetermined number of commutations. The microprocessor 20 will then wait for the other motor to commutate, before it supplies the first motor again. Thus, the first motor to commutate may simply be left to wait until the other motor commutates, and first motor 22 and the second motor 24 will effectively work in synchronicity, as far as the overall angle of rotation is considered.

As it is indicated above, the steps 105 to 108 of the methods essentially correspond to the steps 101 to 104. The skilled person will thus realise that the determination of the commutation by means of detection of change in back electromotive force is not limited to the operation of two or more mechanically commutated electric motors. Rather, this way of determining a commutation may also be utilized to control any individual, mechanically commutated electric motor so as to allow it to operate as a stepper motor.

As mentioned, the fact that the motors are run in steps, does not exclude that the duty cycle ratio for the motors are reduced or increased according to a predetermined scheme, which depends on the application, and does thus not form part of this invention. The duty cycle ratio being understood as the ratio between the time the switching means is active to the sum of an active-inactive cycle.

The invention claimed is:

1. A method for controlling a mechanically commutated electric motor having a number of commutations per revolution of the mechanically commutated electric motor, said method comprising
    providing a power supply for said mechanically commutated electric motor,
    detecting the commutation of the mechanically commutated electric motor by means of detection of a change in back electromotive force, when said mechanically commutated electric motor commutates, and
    halting the power supply to the mechanically commutated electric motor to stop the rotation of the motor in response to detection of a predetermined number of commutations and then supplying power to restart the motor.

2. A method according to claim 1, wherein said number of detected commutations is one.

3. A method according to claim 2, wherein said change in back electromotive force is detected by measurement of the voltage over an inductor and/or a resistor connected in series with said mechanically commutated electric motor in a supply line thereto.

4. A method according to claim 3, wherein the mechanically commutated electric motor is a universal or series motor comprising at least one field coil, and wherein said at least one field coil comprises the inductor over which said voltage is measured.

5. A method according to claim 1, wherein the mechanically commutated electric motor is controlled by means of pulse width modulation by a microprocessor.

6. A method according to claim 1, wherein, if a commutation is detected, but said predetermined number of commutations has not been reached, the supply current is reduced during the commutation.

7. A method according to claim 1, adapted for controlling at least one further mechanically commutated electric motor having a number of commutations per revolution of the mechanically commutated electric motor, said method comprising controlling the power supply to said first mechanically commutated motor and said further mechanically commutated motor by means of a microprocessor, wherein said method comprises the steps of
 a) detecting the respective commutations of each of said first and said further mechanically commutated electric motor by means of detection of a change in back electromotive force, when each of said mechanically commutated electric motors commutate,
 determining the rotational angle of the output of each mechanically commutated electric motor based on said respective detection of the change in back electromotive force and the number of commutations per revolution of the motor,
 b) when one of said first mechanically commutated electric motor or said further mechanically commutated electric motor reaches said predetermined angle disabling the power supply to that mechanically commutated electric motor,
 c) enabling the power supply to said one of said first mechanically commutated electric motor and said further mechanically commutated electric motor again when the other of said first mechanically commutated electric motor and further mechanically commutated electric motor reaches said predetermined angle.

8. A method according to claim 7, wherein said first mechanically commutated electric motor and said further mechanically commutated electric motor are controlled by one and the same microprocessor.

9. The method according to claim 1 for use in furniture.

10. A method for controlling a mechanically commutated electric motor having a number of commutations per revolution of the motor, said method comprising
 providing a power supply for said mechanically commutated electric motor,
 detecting the commutation of the mechanically commutated electric motor by means of detection of a change in back electromotive force, when said mechanically commutated electric motor commutates,
 determining the rotational angle of the output of said mechanically commutated electric motor based on said detection of the change in back electromotive force and the number of commutations per revolution of the mechanically commutated electric motor, and
 halting the power supply to the mechanically commutated electric motor to stop the motor in response to determination that the output of said mechanically commutated electric motor has reached a predetermined rotational angle, and then supplying power to restart the motor.

11. A method according to claim 10, adapted for controlling at least one further mechanically commutated electric motor having a number of commutations per revolution of the mechanically commutated electric motor, said method comprising controlling the power supply to said first mechanically commutated motor and said further mechanically commutated motor by means of a microprocessor, wherein said method comprises the steps of
 a) detecting the respective commutations of each of said first and said further mechanically commutated electric motor by means of detection of a change in back electromotive force, when each of said mechanically commutated electric motors commutate,
 determining the rotational angle of the output of each mechanically commutated electric motor based on said respective detection of the change in back electromotive force and the number of commutations per revolution of the motor,
 b) when one of said first mechanically commutated electric motor or said further mechanically commutated electric motor reaches said predetermined angle disabling the power supply to that mechanically commutated electric motor,
 c) enabling the power supply to said one of said first mechanically commutated electric motor and said further mechanically commutated electric motor again when the other of said first mechanically commutated electric motor and further mechanically commutated electric motor reaches said predetermined angle.

* * * * *